United States Patent [19]

Willming

[11] Patent Number: 5,802,107
[45] Date of Patent: Sep. 1, 1998

[54] SYMBOL ROTATOR

[75] Inventor: David A. Willming, Palatine, Ill.

[73] Assignee: Zenith Electronics Corporation, Glenview, Ill.

[21] Appl. No.: 713,778

[22] Filed: Sep. 13, 1996

[51] Int. Cl.$^6$ .................. H04L 5/12; H04L 23/02
[52] U.S. Cl. .................. 375/265; 371/2.1; 382/296
[58] Field of Search .................. 375/265, 363, 375/365; 371/2.1, 45; 382/296, 297

[56] References Cited

U.S. PATENT DOCUMENTS

| | | | |
|---|---|---|---|
| 4,312,070 | 1/1982 | Cuombes et al. | 371/40 |
| 5,327,158 | 7/1994 | Takahashi et al. | 345/126 |
| 5,410,647 | 4/1995 | Peaslee et al. | 395/150 |
| 5,442,646 | 8/1995 | Chadwick et al. | 371/43 |
| 5,509,031 | 4/1996 | Johnson et al. | 375/262 |
| 5,535,228 | 7/1996 | Dung et al. | 371/49.1 |
| 5,541,955 | 7/1996 | Jacobsmeyer | 375/222 |
| 5,559,561 | 9/1996 | Wei | 348/470 |
| 5,684,835 | 11/1997 | Kroeger et al. | 375/325 |
| 5,708,665 | 1/1998 | Luthi et al. | 371/5.1 |

*Primary Examiner*—Stephen Chin
*Assistant Examiner*—Mohammad Ghayour

[57] ABSTRACT

A first station encodes data as data symbols, rotates the data symbols so that data symbols corresponding to one another across sync portions of data segments of a frame are arranged to be processed together, and inserts the rotated data symbols into data portions of the data segments of the frame such that the frame has a plurality of data segments, wherein each data segment has a segment sync portion and a data portion. A second station processes the data symbols so that corresponding data symbols in a first set of data symbols are processed with a twelve data symbol delay and corresponding data symbols in a second set of data symbols are processed with a twenty-four data symbol delay depending upon the position of the data symbols in relation to the sync portions.

27 Claims, 8 Drawing Sheets

| Shift Amount | Input Bytes | | | | | | | | | | | |
|---|---|---|---|---|---|---|---|---|---|---|---|---|
| | B0 | B1 | B2 | B3 | B4 | B5 | B6 | B7 | B8 | B9 | B10 | B11 |
| Shift by 0 | C0 | C1 | C2 | C3 | C4 | C5 | C6 | C7 | C8 | C9 | C10 | C11 |
| Shift by 4 | C4 | C5 | C6 | C7 | C8 | C9 | C10 | C11 | C0 | C1 | C2 | C3 |
| Shift by 8 | C8 | C9 | C10 | C11 | C0 | C1 | C2 | C3 | C4 | C5 | C6 | C7 |

```
A Shift of  0  is used for  18  groups of twelve bytes
           4                17
           8                17
           0                17
           4                18
           8                17
           0                17
           4                17
           8                18
           0                17
           4                17
           8                17
```

| Shift Amount | Input Symbol | | | | | | | | | | | |
|---|---|---|---|---|---|---|---|---|---|---|---|---|
| | E0 | E1 | E2 | E3 | E4 | E5 | E6 | E7 | E8 | E9 | E10 | E11 |
| Shift by 0 | F0 | F1 | F2 | F3 | F4 | F5 | F6 | F7 | F8 | F9 | F10 | F11 |
| Shift by 4 | F8 | F9 | F10 | F11 | F0 | F1 | F2 | F3 | F4 | F5 | F6 | F7 |
| Shift by 8 | F4 | F5 | F6 | F7 | F8 | F9 | F10 | F11 | F0 | F1 | F2 | F3 |

| Symbol | Symbol Group | Segment 0 | | | Segment 1 | | | Segment 2 | | | Segment 3 | | | Segment 4 | | |
|---|---|---|---|---|---|---|---|---|---|---|---|---|---|---|---|---|
| | | Trellis | Byte | Bits | Trellis | Byte | Bits | Trellis | Byte | Bits | Trellis | Byte | Bits | Trellis | Byte | Bits |
| 0 | F0 | E0 | 0 | 7,6 | E4 | 208 | 5,4 | E8 | 412 | 3,2 | E0 | 616 | 1,0 | E4 | 828 | 7,6 |
| 1 | F1 | E1 | 1 | 7,6 | E5 | 209 | 5,4 | E9 | 413 | 3,2 | E1 | 617 | 1,0 | E5 | 829 | 7,6 |
| 2 | F2 | E2 | 2 | 7,6 | E6 | 210 | 5,4 | E10 | 414 | 3,2 | E2 | 618 | 1,0 | E6 | 830 | 7,6 |
| 3 | F3 | E3 | 3 | 7,6 | E7 | 211 | 5,4 | E11 | 415 | 3,2 | E3 | 619 | 1,0 | ... | ... | ... |
| 4 | F4 | E4 | 4 | 7,6 | E8 | 212 | 5,4 | E0 | 416 | 3,2 | E4 | 620 | 1,0 | ... | ... | ... |
| 5 | F5 | E5 | 5 | 7,6 | E9 | 213 | 5,4 | E1 | 417 | 3,2 | E5 | 621 | 1,0 | ... | ... | ... |
| 6 | F6 | E6 | 6 | 7,6 | E10 | 214 | 5,4 | E2 | 418 | 3,2 | E6 | 622 | 1,0 | ... | ... | ... |
| 7 | F7 | E7 | 7 | 7,6 | E11 | 215 | 5,4 | E3 | 419 | 3,2 | E7 | 623 | 1,0 | ... | ... | ... |
| 8 | F8 | E8 | 8 | 7,6 | E0 | 204 | 5,4 | E4 | 408 | 3,2 | E8 | 612 | 1,0 | ... | ... | ... |
| 9 | F9 | E9 | 9 | 7,6 | E1 | 205 | 5,4 | E5 | 409 | 3,2 | E9 | 613 | 1,0 | ... | ... | ... |
| 10 | F10 | E10 | 10 | 7,6 | E2 | 206 | 5,4 | E6 | 410 | 3,2 | E10 | 614 | 1,0 | ... | ... | ... |
| 11 | F11 | E11 | 11 | 7,6 | E3 | 207 | 5,4 | E7 | 411 | 3,2 | E11 | 615 | 1,0 | ... | ... | ... |
| 12 | F0 | E0 | 0 | 5,4 | E4 | 208 | 3,2 | E8 | 412 | 1,0 | E0 | 624 | 7,6 | ... | ... | ... |
| 13 | F1 | E1 | 1 | 5,4 | E5 | 209 | 3,2 | E9 | 413 | 1,0 | E1 | 625 | 7,6 | ... | ... | ... |
| ... | ... | ... | ... | ... | ... | ... | ... | ... | ... | ... | ... | ... | ... | ... | ... | ... |
| 19 | F7 | E7 | 7 | 5,4 | E11 | 215 | 3,2 | E3 | 419 | 1,0 | E7 | 631 | 7,6 | ... | ... | ... |
| 20 | F8 | E8 | 8 | 5,4 | E0 | 204 | 3,2 | E4 | 408 | 1,0 | E8 | 632 | 7,6 | ... | ... | ... |
| 21 | F9 | E9 | 9 | 5,4 | E1 | 205 | 3,2 | E5 | 409 | 1,0 | E9 | 633 | 7,6 | ... | ... | ... |
| 22 | F10 | E10 | 10 | 5,4 | E2 | 206 | 3,2 | E6 | 410 | 1,0 | E10 | 634 | 7,6 | ... | ... | ... |
| 23 | F11 | E11 | 11 | 5,4 | E3 | 207 | 3,2 | E7 | 411 | 1,0 | E11 | 635 | 7,6 | ... | ... | ... |

*Figure 11A*

| Symbol | Symbol Group | Segment 0 | | | Segment 1 | | | Segment 2 | | | Segment 3 | | | Segment 4 | | |
|---|---|---|---|---|---|---|---|---|---|---|---|---|---|---|---|---|
| | | Trellis | Byte | Bits | Trellis | Byte | Bits | Trellis | Byte | Bits | Trellis | Byte | Bits | Trellis | Byte | Bits |
| 24 | F0 | E0 | 0 | 3,2 | E4 | 208 | 1,0 | E8 | 420 | 7,6 | E0 | 624 | 5,4 | ... | ... | ... |
| 25 | F1 | E1 | 1 | 3,2 | E5 | 209 | 1,0 | E9 | 421 | 7,6 | E1 | 625 | 5,4 | ... | ... | ... |
| ... | ... | ... | ... | ... | ... | ... | ... | ... | ... | ... | ... | ... | ... | ... | ... | ... |
| 31 | F7 | E7 | 7 | 3,2 | E11 | 215 | 1,0 | E3 | 427 | 7,6 | ... | ... | ... | ... | ... | ... |
| 32 | F8 | E8 | 8 | 3,2 | E0 | 204 | 1,0 | E4 | 428 | 7,6 | ... | ... | ... | ... | ... | ... |
| 33 | F9 | E9 | 9 | 3,2 | E1 | 205 | 1,0 | E5 | 429 | 7,6 | ... | ... | ... | ... | ... | ... |
| 34 | F10 | E10 | 10 | 3,2 | E2 | 206 | 1,0 | E6 | 430 | 7,6 | ... | ... | ... | ... | ... | ... |
| 35 | F11 | E11 | 11 | 3,2 | E3 | 207 | 1,0 | E7 | 431 | 5,4 | ... | ... | ... | ... | ... | ... |
| 36 | F0 | E0 | 0 | 1,0 | E4 | 216 | 7,6 | E8 | 420 | 5,4 | ... | ... | ... | ... | ... | ... |
| 37 | F1 | E1 | 1 | 1,0 | E5 | 217 | 7,6 | E9 | 421 | ... | ... | ... | ... | ... | ... | ... |
| ... | ... | ... | ... | ... | ... | ... | ... | ... | ... | ... | ... | ... | ... | ... | ... | ... |
| 47 | F11 | E11 | 11 | 1,0 | E3 | 227 | 7,6 | ... | ... | ... | ... | ... | ... | ... | ... | ... |
| 48 | F0 | E0 | 12 | 7,6 | E4 | 216 | 5,4 | ... | ... | ... | ... | ... | ... | ... | ... | ... |
| 49 | F1 | E1 | 13 | 7,6 | E5 | 217 | 5,4 | ... | ... | ... | ... | ... | ... | ... | ... | ... |
| ... | ... | ... | ... | ... | ... | ... | ... | ... | ... | ... | ... | ... | ... | ... | ... | ... |
| 95 | F11 | E11 | 23 | 1,0 | ... | ... | ... | ... | ... | ... | ... | ... | ... | ... | ... | ... |
| 96 | F0 | E0 | 24 | 7,6 | ... | ... | ... | ... | ... | ... | ... | ... | ... | ... | ... | ... |
| 97 | F1 | E1 | 25 | 7,6 | ... | ... | ... | ... | ... | ... | ... | ... | ... | ... | ... | ... |
| ... | ... | ... | ... | ... | ... | ... | ... | ... | ... | ... | ... | ... | ... | ... | ... | ... |
| 767 | F11 | E11 | 191 | 1,0 | ... | ... | ... | ... | ... | ... | ... | ... | ... | ... | ... | ... |

| Symbol | Symbol Group | Segment 0 | | | Segment 1 | | | Segment 2 | | | Segment 3 | | | Segment 4 | | |
|---|---|---|---|---|---|---|---|---|---|---|---|---|---|---|---|---|
| | | Trellis | Byte | Bits | Trellis | Byte | Bits | Trellis | Byte | Bits | Trellis | Byte | Bits | Trellis | Byte | Bits |
| 768 | F0 | E0 | 192 | 7,6 | ... | ... | ... | ... | ... | ... | ... | ... | ... | ... | ... | ... |
| 769 | F1 | E1 | 193 | 7,6 | ... | ... | ... | ... | ... | ... | ... | ... | ... | ... | ... | ... |
| ... | ... | ... | ... | ... | ... | ... | ... | ... | ... | ... | ... | ... | ... | ... | ... | ... |

Figure 11D

| Symbol | Segment 0 | | | Segment 1 | | | Segment 2 | | | Segment 3 | | | Segment 4 | | |
|---|---|---|---|---|---|---|---|---|---|---|---|---|---|---|---|
| | Trellis | Byte | Bits | Trellis | Byte | Bits | Trellis | Byte | Bits | Trellis | Byte | Bits | Trellis | Byte | Bits |
| 815 | 11 | 203 | 1,0 | 3 | 419 | 7,6 | 7 | 623 | 5,4 | 11 | 827 | 3,2 | ... | ... | ... |
| 816 | 0 | 204 | 7,6 | 4 | 408 | 5,4 | 8 | 612 | 3,2 | 0 | 816 | 1,0 | ... | ... | ... |
| 817 | 1 | 205 | 7,6 | 5 | 409 | 5,4 | 9 | 613 | 3,2 | 1 | 817 | 1,0 | ... | ... | ... |
| ... | ... | ... | ... | ... | ... | ... | ... | ... | ... | ... | ... | ... | ... | ... | ... |
| 827 | 11 | 215 | 7,6 | 3 | 419 | 5,4 | 7 | 623 | 3,2 | 11 | 827 | 1,0 | ... | ... | ... |

| | Frame Sync Segment |
|---|---|
| | Segment 0 |
| | Segment 1 |
| Segment Sync | ⋮ |
| | Segment 311 |
| | Segment 312 |

SYMBOL ROTATOR

TECHNICAL FIELD OF THE INVENTION

The present invention relates to an apparatus for processing data communicated from a transmitter to a receiver.

BACKGROUND OF THE INVENTION

In an 8 VSB terrestrial communication system (i.e., a vestigial sideband terrestrial communication system which transmits symbols each having one of 8 possible signal levels), information is typically transmitted by a transmitting station to a receiving station over the air. In an example of such a system, each two bits of data to be communicated is encoded by the transmitting station as a symbol having one of eight possible signal amplitude levels so that each byte of data having eight bits is represented by four symbols.

In one such system, disclosed in the ATSC digital television standard published on Sep. 16, 1995, each pair of bits is supplied to a precoder and trellis encoder. One of the bits in each pair of bits is supplied to the precoder, and the other of the bits in each pair of bits is supplied to the trellis encoder. The precoder and trellis encoder each incorporates twelve bit delay elements. Thus, the precoder and trellis encoder may be envisioned as twelve identical precoders and trellis encoders with (i) an input multiplexer for sequentially connecting input sets of two bits to the twelve identical precoders and trellis encoders and (ii) an output multiplexer for sequentially connecting output sets of three bits to a symbol mapper. The twelve precoders and trellis encoders interleave the bit pairs so that each bit pair in a first byte of data is processed by a first precoder and trellis encoder, so that each bit pair in a second byte of data is processed by a second precoder and trellis encoder, . . . and so that each bit pair in a twelfth byte of data is processed by a twelfth precoder and trellis encoder. Each subsequent sets of twelve bytes are similarly processed.

The precoder and trellis encoder converts each pair of input bits to three corresponding output bits which are supplied to the symbol mapper. The symbol mapper maps each set of three output bits to a symbol having a corresponding one of eight signal levels of an eight-level constellation. The resulting symbols are supplied to a multiplexer which adds synchronization symbols to the data symbols in order to structure the data and synchronization symbols in a frame.

A frame is structured so that it has 313 segments. The first segment of a frame (a frame sync segment) includes (i) a segment sync portion containing four segment sync symbols and (ii) a field sync portion containing 828 pseudorandomly generated field sync symbols. Each of the other 312 segments includes (i) a segment sync portion containing four segment sync symbols and (ii) a data portion containing 828 symbols of data.

Thereafter, the symbols in the above described frame structure are transmitted, and are received by a receiver. The receiver includes a comb filter and a trellis decoder. The comb filter is present in order to filter out interference which may be caused by NTSC channels broadcast by nearby stations. The trellis decoder in the receiver is present in order to decode the symbols in the received frames into their corresponding original bit pairs. The trellis decoder is similar to the trellis encoder in that the trellis decoder processes the symbols of the same byte together. Thus, these symbols must enter the trellis decoder in the correct sequence.

As can be noted from the above frame description, the frames that are used in the typical 8 VSB system contain only 17.25 groups of data symbols per data segment, wherein each group contains twelve bytes, and wherein each byte contains four symbols. Accordingly, each data segment of each frame carries an incomplete group of bytes such that the bytes of the incomplete group are split between two data segments. As a result, the segment sync symbols in the segment sync portion of a data segment separate some data symbols of some bytes from the other data symbols of these bytes. Thus, if the data symbols are packed into a frame in the same sequence as they are output from the symbol mapper, the symbols will not enter the trellis decoder in the correct sequence. Accordingly, the trellis decoder in the receiver will not process the symbols of the same bytes together thereby producing errors in the decoding of the transmitted symbols.

The present invention includes an apparatus for rotating the data to be inserted into the frame structure in such a way that the symbols enter the trellis decoder in the correct sequence so that decoding errors due to the presence of segment sync symbols are avoided. The present invention also includes a receiver for processing such rotated data.

SUMMARY OF THE INVENTION

Therefore, in accordance with one aspect of the present invention, a processing apparatus processes data elements to be inserted into a frame. The frame has a plurality of data segments, and each data segment has a sync portion and a data portion. The processing apparatus comprises an encoding means, a rotating means, and an inserting means. The encoding means encodes data as data elements. The rotating means rotates the data elements so that data elements corresponding to one another across a sync portion of a segment are arranged to be processed together. The inserting means inserts the rotated data elements into the data portions of the frame.

In accordance with another aspect of the present invention, a receiver receives data symbols arranged in a frame. The frame has a plurality of data segments. Each data segment has a sync portion and a data portion. Each sync portion contains four sync symbols, and each data portion contains 828 data symbols. The data symbols are rotated so that data symbols of the same bytes separated by a sync portion of a data segment are arranged to be processed together. The receiver comprises a receiving means and a processing means. The receiving means receives the data symbols of the frame. The processing means processes corresponding pairs of data symbols of the same bytes together even though the data symbols of the same bytes are separated by the sync portions of each data segment.

In accordance with yet another aspect of the present invention, a receiver receives data elements arranged in a frame. The frame has a plurality of data segments such that each data segment has a sync portion and a data portion. Each sync portion contains S sync elements, and each data portion contains N data elements. The data elements are rotated so that data elements corresponding to one another across each sync portion of each data segment are arranged to be processed together. The receiver comprises a receiving means and a processing means. The receiving means receives the data elements of the frame. The processing means processes corresponding pairs of data elements depending upon a separation between corresponding data elements across the sync portions of each data segment.

BRIEF DESCRIPTION OF THE DRAWINGS

These and other features and advantages of the present invention will become more apparent from a detailed con-

Figure 1:
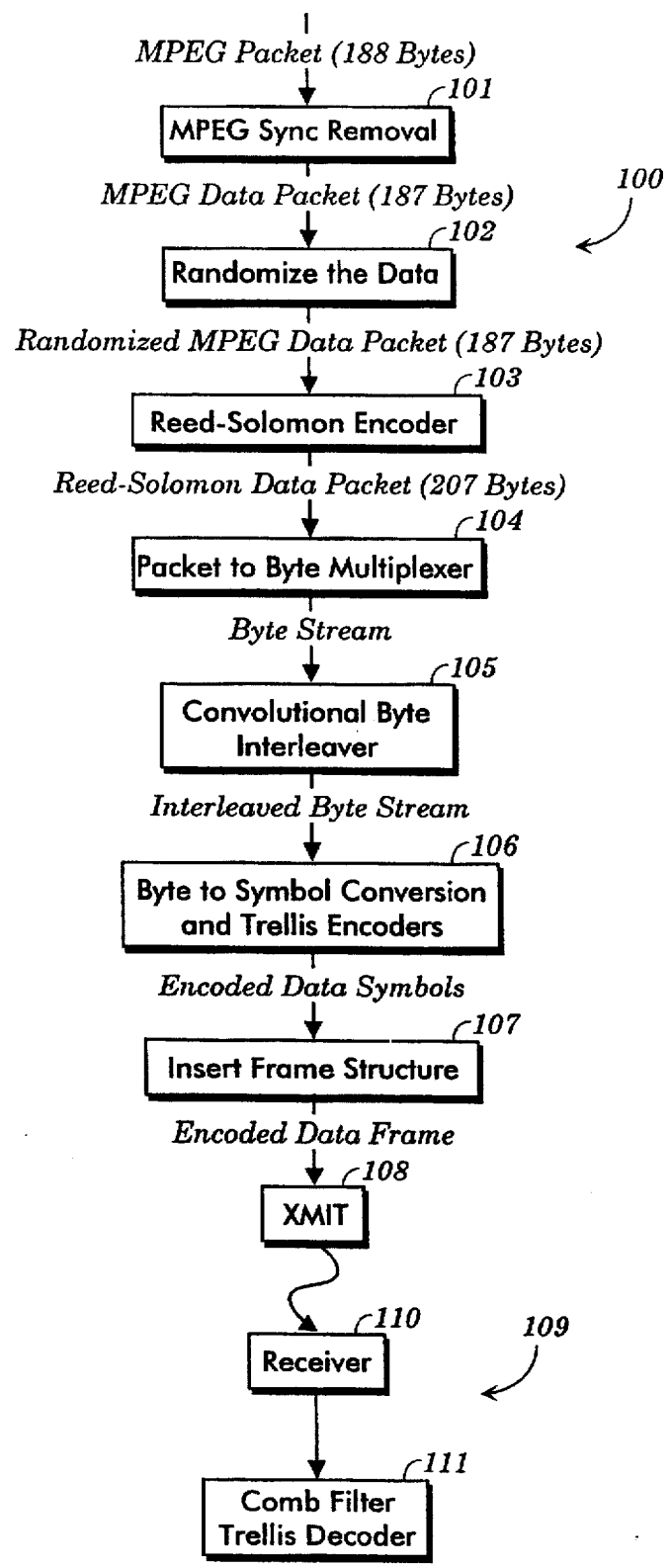
Figure 2:
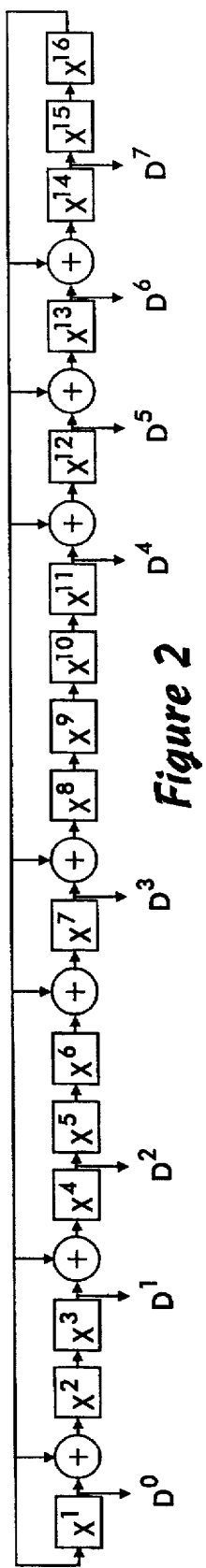
Figure 3:
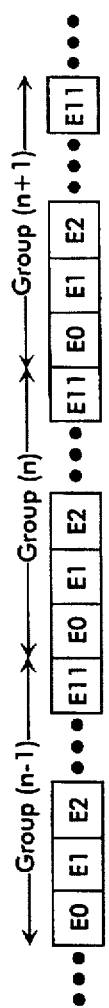
Figure 4:
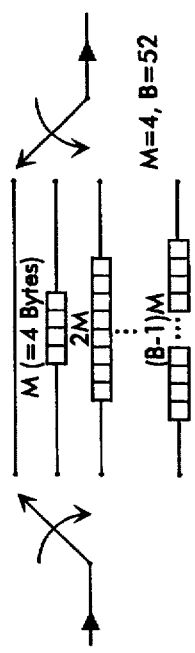
Figure 5:
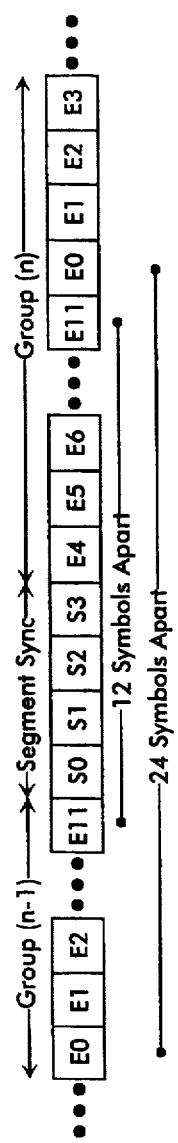
Figure 6:
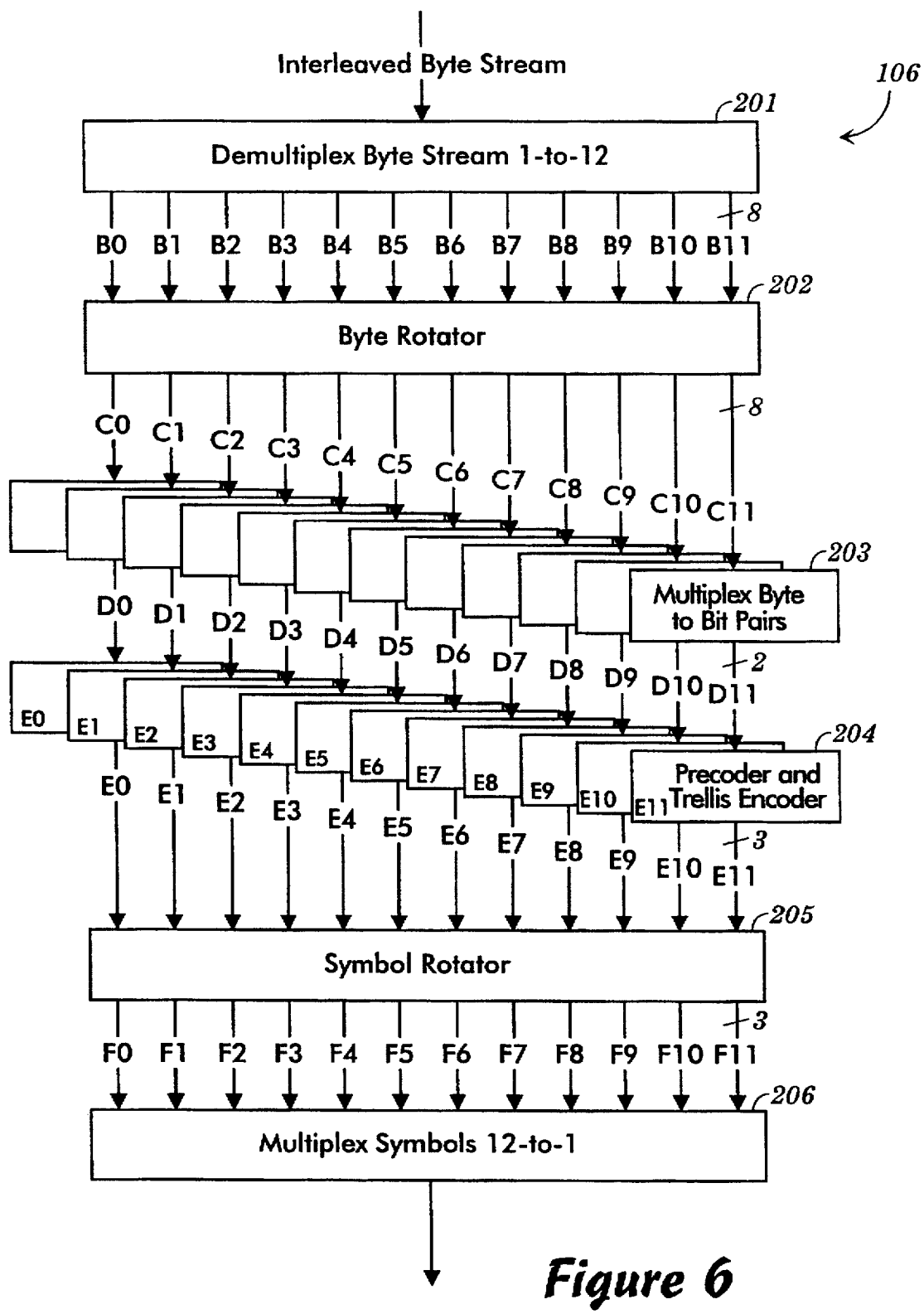
Figures 7, 8, 9, 10:
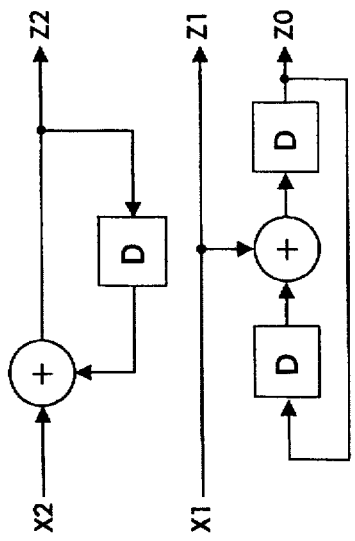
Figures 12, 13:
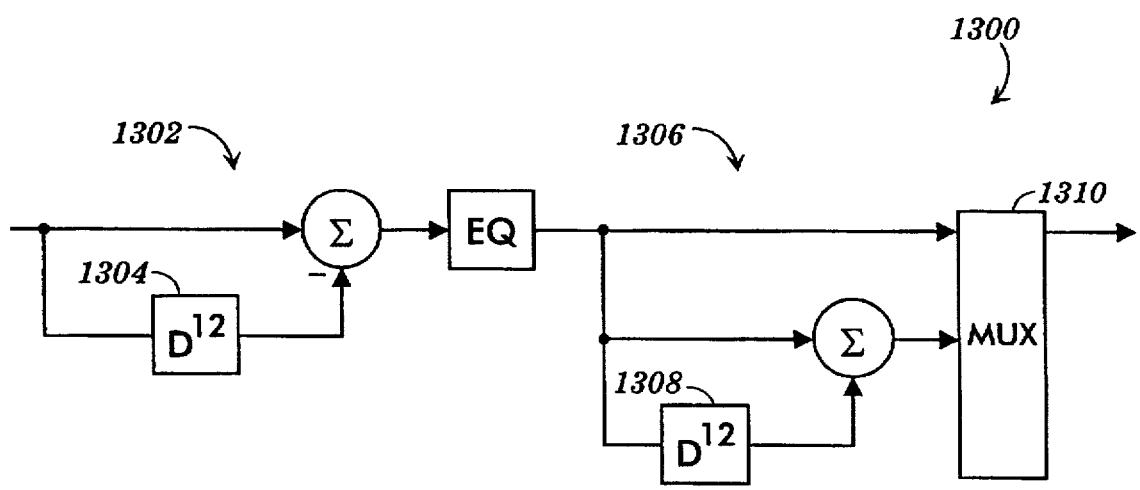

3 sideration of the invention when taken in conjunction with the drawings in which:

FIG. 1 is a block diagram of an apparatus incorporating the present invention;

FIG. 2 illustrates a pseudorandom number generator which may be implemented for the data randomizer of FIG. 1 in order to randomize data;

FIG. 3 is a convolutional byte interleaver which may be implemented for the convolutional byte interleaver of FIG. 1;

FIG. 4 illustrates the grouping of symbols as a result of encoding by the byte-to-symbol converter and trellis encoders of FIG. 1;

FIG. 5 illustrates the interleaved symbols of FIG. 4 to which segment sync symbols of a segment have been added;

FIG. 6 illustrates the byte-to-symbol converter and trellis encoder of FIG. 1 in additional detail;

FIG. 7 is a table illustrating the byte rotation implemented by the byte rotator of FIG. 6;

FIG. 8 is a table illustrating the correspondence between the rotation implemented in accordance with the table of FIG. 7 and the groups of rotated data;

FIG. 9 illustrates a precoder and trellis encoder which may be used for the precoder and trellis encoders of FIG. 6;

FIG. 10 is a table illustrating the rotation implemented by the symbol rotator of FIG. 6;

FIGS. 11A, 11B, 11C, and 11D is a table illustrating the sequence in which data symbols are inserted into a frame in accordance with the present invention;

FIG. 12 illustrates the structure of a frame into which data is inserted according to the present invention; and, FIG. 13 illustrates a comb filter which introduces the correct amount of delay for the data shown in FIGS. 11A, 11B, 11C, and 11D in order for a trellis decoder in a receiver to correctly process the symbols of the same byte together.

DETAILED DESCRIPTION

As illustrated in FIG. 1, a first station 100 includes an MPEG sync remover 101 which receives MPEG data packets from a MPEG2 data source (not shown) and which is more fully described in application Ser. No. 08/479,428 that was filed on Jun. 7, 1995. The MPEG data packets arrive at a rate of about 12.893 Kpackets per second. These MPEG packets include 187 bytes of MPEG data and one byte of MPEG synchronization. Because MPEG synchronization is unnecessary for the processing by the remainder of the 8 VSB terrestrial modem encoder of the present invention, the MPEG sync remover 101 removes the one byte of MPEG synchronization from the MPEG packets and passes only the 187 bytes of MPEG data to a data randomizer 102 which randomizes each MPEG data packet supplied by the MPEG sync remover 101. The data randomizer 102 may implement a bitwise EXCLUSIVE OR operation between each data byte received from the MPEG sync remover 101 and a pseudorandom sequence.

The pseudorandom sequence may be produced, for example, by the random sequence generator shown in FIG. 2. The pseudorandom sequence produced by the random sequence generator of FIG. 2 is initialized at the first data packet of a frame, and is reinitialized every 312 data packets thereafter. The registers of this random sequence generator shown in FIG. 2 are initialized to 0xF180 at the start of each frame (where the outputs of registers X16, X15, X14, X13, X9, X8 are set to a value of one). The pseudorandom sequence generator shown in FIG. 2 is advanced for each byte of the input data packet. The pseudorandom sequence generated by this random sequence generator is provided at outputs D0–D7 which may be connected to corresponding inputs of an EXCLUSIVE OR. The other inputs of the EXCLUSIVE OR receive the corresponding bits in the bytes from the MPEG sync remover 101.

The output of the data randomizer 102 is supplied to a Reed Solomon encoder 103. The Reed Solomon encoder 103 calculates twenty bytes of Reed Solomon parity and appends these twenty bytes to the randomized data packets produced by the data randomizer 102. Accordingly, the Reed Solomon encoder 103 produces data packets each of which comprises 207 bytes (i.e., 187 bytes of randomized data from the data randomizer 102 and twenty bytes of Reed Solomon parity).

The data packets from the Reed Solomon encoder 103 are supplied to a packet-to-byte multiplexer 104. The packet-to-byte multiplexer 104 converts each 207 byte Reed Solomon data packet into a continuous byte stream. This byte stream is then processed by a convolutional byte interleaver 105 which is shown conventionally by FIG. 3 and which is described more fully in application Ser. No. 08/315,153 that was filed on Sep. 29, 1994. Each block in FIG. 3 is a register that holds one byte. The convolutional byte interleaver 105 is synchronized such that the first byte of the first Reed Solomon data packet enters the uppermost branch of the interleaver shown in FIG. 3, the second byte of the first Reed Solomon data packet enters the second branch of the interleaver shown in FIG. 3, . . . the fifty-second byte of the first Reed Solomon data packet enters the lowermost branch of the interleaver shown in FIG. 3, the fifty-third byte of the first Reed Solomon data packet enters the uppermost branch of the interleaver shown in FIG. 3, and so on.

The interleaved byte stream from the convolutional byte interleaver 105 is supplied to a byte-to-symbol converter and trellis encoder 106 which encodes the data bits in the received bytes as data symbols. As discussed in more detail hereinafter, the trellis encoder portion of the byte-to-symbol converter and trellis encoder 106 is, in effect, twelve trellis encoders in order to accommodate the twelve symbol delay of the comb filter which is used in the receiver, such as a second station 109 of FIG. 1. That is, the presence of the comb filter in the receiver requires that the byte-to-symbol converter and trellis encoder 106 encode the data bits of the received data bytes as encoded data symbols so that the encoded data symbols of each trellis encoder are separated by the data symbols of the eleven other trellis encoders. Hence, there are, in effect, twelve trellis encoders. Additionally, the byte-to-symbol converter and trellis encoder 106 must encode the data bit pairs of the received data bytes as encoded data symbols such that the data bit pairs of the same bytes are encoded by the same encoder.

FIG. 4 illustrates the transmitted data symbols. For example, symbol E0 of group n−1 may represent a symbol resulting from the encoding by encoder zero of bits 7,6 of byte zero, symbol E0 of group n may represent a symbol resulting from the encoding by encoder zero of bits 5,4 of byte zero, symbol E0 of group n+1 may represent a symbol resulting from the encoding by encoder zero of bits 3,2 of byte zero, and so forth. Thus, each symbol E0 is separated from the nearest other symbols E0 by eleven symbols.

Similarly, symbol E1 of group n−1 may represent a symbol resulting from the encoding by encoder one of bits 7,6 of byte one, symbol E1 of group n may represent a symbol resulting from the encoding by encoder one of bits 5,4 of byte one, symbol E1 of group n+1 may represent a symbol resulting from the encoding by encoder one of bits 3,2 of byte one, and so forth. Each symbol E1 is separated from the nearest other symbols E1 by eleven symbols. Thus, encoder zero encodes the symbols of a first byte, encoder one encodes the symbols of a second byte, encoder two encodes the symbols of a third byte, and so on. Accordingly, symbols are encoded in groups of twelve bytes and are transmitted in groups of twelve bytes.

As discussed above, each segment includes 832 symbols in the data stream. These 832 symbols include four segment sync symbols and 828 data symbols. Thus, the data symbols in the transmitted data stream are periodically interrupted by segment sync symbols as illustrated in FIG. 5. Because the transmitted data symbols from each encoder must remain properly spaced, in order to be correctly processed by the trellis decoder in the receiver, and because the segment sync symbols would otherwise disrupt the proper spacing of the data symbols, the present invention rotates the data symbols in each segment by a predetermined amount in order to reinstate the data symbols to the proper spacing.

For example, this amount of rotation may be zero for the data symbols in the first data segment following the frame sync segment, may be four for the symbols in the next data segment, may be eight for the data symbols in the next data segment, may be zero for the data symbols in the next data segment, and so on. Thus, the data symbol immediately following the segment sync symbols in the data portion of the first data segment following the frame sync segment is symbol E0 corresponding to the trellis encoder zero. The next data symbols in this data segment in order are E1, E2, E3, E4, E5, E6, E7, E8, E9, E10, and E11 as shown by the group (n−1) data symbols in FIG. 5. This pattern is repeated throughout this data segment (segment zero) as shown by the trellis column for segment 0 in the table of FIGS. 11A, 11B, 11C, and 11D.

However, the data symbol immediately following the segment sync symbols (i.e., segment sync symbols S0, S1, S2, and S3 of FIG. 5) in the second data segment following the frame sync segment is symbol E4 corresponding to trellis encoder four. The next data symbols in this data segment in order are E5, E6, E7, E8, E9, E10, E11, E0, E1, E2, and E3 as shown by the group (n) symbols in FIG. 5. This pattern is repeated throughout this data segment (segment one) as shown by the trellis column for segment 1 in the table of FIGS. 11A, 11B, 11C, and 11D.

Similarly, the data symbol immediately following the segment sync symbols (i.e., segment sync symbols S0, S1, S2, and S3) in the third data segment following the frame sync segment is symbol E8 corresponding to trellis encoder eight. The next data symbols in this data segment in order are E9, E10, E11, E0, E1, E2, E3, E4, E5, E6, and E7. This pattern is repeated throughout this data segment (segment two) as shown by the trellis column for segment 2 in the table of FIGS. 11A, 11B, 11C, and 11D.

The byte-to-symbol converter and trellis encoder 106, which is shown in more detail in FIG. 6, converts the interleaved byte stream from the convolutional byte interleaver 105 into symbols having the correct symbol sequence to be properly processed by the second station 109 is (FIG. 1). The byte-to-symbol converter and trellis encoder 106 includes a byte demultiplexer 201, a byte rotator 202, byte-to-bit-pair multiplexers 203, precoders and trellis encoders 204, a symbol rotator 205, and a symbol multiplexer 206.

The interleaved byte stream from the convolutional byte interleaver 105 enters the byte demultiplexer 201. The bytes are grouped by the byte demultiplexer 201 into groups of bytes holding twelve bytes per group. These twelve bytes appear on outputs B0–B11 of the byte demultiplexer 201. Each twelve byte group is rotated by the byte rotator 202. The byte rotator 202 has outputs C0–C11 and rotates the bytes on outputs B0–B11 of the byte demultiplexer 201 according to the table illustrated in FIG. 7. As shown by the table in FIGS. 11A, 11B, 11C, and 11D, the order of the bytes in the interleaved byte stream supplied to the byte-to-symbol converter and trellis encoder 106 is changed due to the symbol rotation which is implemented because of the segment sync symbols at the beginning of each data segment. A rotation of the bytes in each group of bytes supplied from the byte demultiplexer 201 to the byte rotator 202 is desirable in order to restore byte order following the adjustment that is made due to the segment sync symbols.

As shown by the table of FIG. 7, the byte rotator 202 rotates the bytes on the outputs B0–B11 by either zero, four, or eight positions. This byte rotation is implemented in order to properly assign the bytes to the correct trellis encoder. Byte rotation follows a periodic pattern that repeats after each twelve segments of the frame. The duration of each byte rotation follows an 18, 17, 17, 17 repeating pattern. That is, as shown by the table of FIG. 8, the first eighteen groups of twelve bytes received by the byte rotator 202 are rotated by zero, the next seventeen groups of twelve bytes received by the byte rotator 202 are rotated by four, the next seventeen groups of twelve bytes received by the byte rotator 202 are rotated by eight, the next seventeen groups of twelve bytes received by the byte rotator 202 are rotated by zero, the next eighteen groups of twelve bytes received by the byte rotator 202 are rotated by four, and so on, such that this 18, 17, 17, 17 . . . pattern is repeated every twelve data segments.

This byte rotation is shown in FIGS. 11A, 11B. 11C, and 11D. FIGS. 11A, 11B, 11C, and 11D illustrate the first five data segments following the frame sync segment of a frame. The last eight data symbols of data segment zero (i.e., data symbols 816–827 of FIG. 11D) correspond to bit pairs 7,6 of bytes 204–215. These bytes 204–215 are completed by the first 36 data symbols in data segment one. The 828 data symbols in data segment zero and the first 36 data symbols in data segment one represent the first eighteen groups of twelve bytes of data processed by the byte rotator 202. As indicated above, the byte rotator 202 applies a rotation of zero to these first eighteen groups of twelve bytes. These first 216 bytes are applied in order (with no rotation) to the corresponding trellis encoders E0–E11.

The byte rotator 202 then applies a rotation of four to the next seventeen groups of data bytes received by the byte rotator 202 so as to return the bytes to their original byte order. These bytes comprise bytes 216–419. This rotation of four causes these bytes to be encoded by the corresponding trellis encoders E4–E3. Thus, data symbol thirty-six in data segment one corresponding to bits 7,6 is in byte 216 and corresponds to trellis encoder four. Accordingly, byte ordering is restored in data segment one starting with the data symbol thirty-six. These seventeen groups of twelve bytes end with data symbol twenty-three of data segment two.

The byte rotator 202 then applies a rotation of eight to the next seventeen groups of twelve bytes received by the byte rotator 202 so as to return the bytes to their original byte order. These bytes comprise bytes 420–623. This rotation of eight causes these bytes to be encoded by the corresponding trellis encoders E8–E7. Thus, data symbol twenty-four in data segment two corresponding to bits 7,6 is in byte 420 and corresponds to trellis encoder eight. Accordingly, byte ordering is restored in data segment two starting with data symbol twenty-four. These seventeen groups of twelve bytes ends with data symbol eleven of data segment three.

The byte rotator 202 then applies a rotation of zero to the next seventeen groups of twelve bytes received by the byte rotator 202 so as to return the bytes to their original byte order. These bytes comprise bytes 624–827. This rotation of zero causes these bytes to be encoded by the corresponding trellis encoders E0–E11. Thus, data symbol twelve in data segment three corresponding to bits 7,6 is in byte 624 and corresponds to trellis encoder zero. These seventeen groups of twelve bytes ends with data symbol 827 of data segment three. Accordingly, byte ordering is restored in data segment three starting with data symbol twelve.

Byte-to-bit-pair multiplexers 203 multiplexes each byte of data supplied on output lines C0–C11 by the byte rotator 202 to four corresponding serial pairs of bits. The bits are supplied by the byte-to-bit-pairs multiplexer 203 on outputs D0–D11 and are processed by the precoders and trellis encoders 204. The precoders and trellis encoders 204 converts the bit pairs on outputs D0–D11 to corresponding sets of three output bits and maps the sets of three output bits to data symbols. Thus, each data symbol has one of eight possible levels defined by three bits. The precoders and trellis encoders 204 includes precoders and trellis encoders E0–E11 which supply data symbols over corresponding outputs E0–E11.

FIG. 9 illustrates a precoder and trellis encoder. The precoder and trellis encoder of FIG. 9 can be replicated twelve times so as to separately encode each bit pair stream on corresponding outputs D0–D11 of the byte-to-bit-pair multiplexer 203. In this case, the delay elements of the precoder and trellis encoder of FIG. 9 are one bit delay elements. Accordingly, bit X2 of a bit pair in the bit pair stream D0 is encoded by the precoder of the precoder and trellis encoder E0 as an output bit Z2, and bit X1 of the bit pair in the bit pair stream D0 is encoded by the trellis encoder of the precoder and trellis encoder E0 as output bits Z1 and Z0. A symbol mapper (not shown) of the precoder and trellis encoder E0 maps the output bits Z2, Z1, Z0 to a corresponding data symbol. Similarly, bit X2 of a bit pair in the bit pair stream D1 is encoded by the precoder of the precoder and trellis encoder E1 as an output bit Z2, and bit X1 of the bit pair in the bit pair stream D1 is encoded by the trellis encoder of the precoder and trellis encoder E1 as output bits Z1 and Z0. A symbol mapper of the precoder and trellis encoder E1 maps these output bits Z2, Z1, Z0 to a corresponding data symbol. The remaining byte streams are similarly processed by the other precoders and trellis encoders E2–E11.

The data symbols on output lines E0–E11 of the precoder and trellis encoders 204 are rotated by the symbol rotator 205 according to the table shown in FIG. 10. This symbol rotation provides the necessary twelve symbol spacing of each encoded symbol stream within a segment and across the segment synchronization symbols. Each rotation is applied to all of the sixty-nine groups of twelve data symbols in a data portion of a data segment. Accordingly, the data symbols in the data portion of the first data segment (segment zero) following the frame sync segment are rotated by zero, the data symbols in the data portion of the second data segment (segment one) are rotated by four, the data symbols in the data portion of the third data segment (segment two) are rotated by eight, the data symbols in the data portion of the fourth data segment (segment three) are rotated by zero, and so on throughout the 312 data segments of a frame.

Thus, with reference to FIG. 10 and to FIGS. 11A, 11B, 11C, and 11D, the data symbols of segment zero (the first data segment following the frame sync segment) are rotated by zero. Accordingly, the encoded data symbols from the encoders E0, E1, E2, . . . E11 of FIG. 6 appear on outputs F0, F1, F2, . . . F11 of the symbol rotator 205 and are transmitted in the order E0–E11. However, the symbols in data segment one (the second data segment following the frame sync segment) are rotated by four. Thus, the encoded data symbols from the encoders E4, E5, E6, . . . E11, E0, . . . E3 of FIG. 6 appear on outputs F0, F1, F2, . . . F11 of the symbol rotator 205 and are transmitted in the order E4, . . . E3.

Moreover, the data symbols in data segment two (the third data segment following the frame sync segment) are rotated by eight. Thus, the encoded data symbols from the encoders E8, E9, E10, E11, E0, . . . E7 of FIG. 6 appear on outputs F0, F1, F2, . . . F11 of the symbol rotator 205 and are transmitted in the order E8, . . . E7. The data symbols in data segment three (the fourth data segment following the frame sync segment) are rotated by zero. Accordingly, the encoded data symbols from the encoders E0, E1, E2, . . . E11 of FIG. 6 appear on outputs F0, F1, F2, . . . F11 of the symbol rotator 205 and are transmitted in the order E0–E11.

With this rotation arrangement, the first data symbol in data segment one (i.e., the data symbol corresponding to bits 5,4 of byte 208) is processed with the symbol which is transmitted twelve symbols earlier (i.e., the data symbol corresponding to bits 7,6 of byte 208). Similarly, the second data symbol in data segment one (i.e., the data symbol corresponding to bits 5,4 of byte 209) is processed with the data symbol which is transmitted twelve symbols earlier (i.e., the data symbol corresponding to bits 7,6 of byte 209). Likewise, each of the data symbols corresponding to bits 5,4 of bytes 210–215 are processed in the second station 109 with bits 7,6 of bytes 210–215 occurring prior to the four segment symbols which are inserted at the beginning of data segment one.

However, the data symbol corresponding to bits 5,4 of byte 204 is separated by twenty-three other data symbols from the symbol corresponding to bits 7,6 of byte 204. Accordingly, as will be discussed hereinafter, the ninth, tenth, eleventh, and twelfth data symbols in a data segment following the four segment sync symbols at the beginning of the data segment occur twenty-four symbols after the previous data symbols from the corresponding trellis encoders. Therefore, this twenty-four symbol delay must be taken into account so that these data symbols corresponding to bits 5,4 in these bytes 204–207 may be processed with the symbols corresponding to bits 7,6 of the corresponding bytes 204–207 near the end of data segment zero. Thereafter in data segment one, the twelve-symbol delay may again be used by the second station 109.

Accordingly, the symbol rotator 205, together with the twelve and twenty-four symbol delay imposed by the second station 109, ensures that data symbols of the same bytes are processed by the same trellis encoder and are therefore, processed together. Similarly, the byte rotator 202 ensures that following this transition across a segment sync portion, the bytes are rotated so that they are again in ascending order rather than in mixed order.

A multiplexer 206 multiplexes the data symbols provided by the symbol rotator 205 back into a stream of data symbols which is provided to a frame structure inserter 107 (FIG. 1). The frame structure inserter 107 inserts the frame structure by adding the frame sync segment and the segment sync symbols to the data symbols in the frame structure which was discussed above and which is shown in FIG. 12. Accordingly, the frame includes a frame sync segment (which is the first segment in a frame) and 312 data segments. The beginning of each segment includes four segment sync symbols. A transmitter 108 receives the frames from the frame structure inserter 107, performs certain signal conditioning on the data contained in the frames, and transmits the frames of symbols in the frame structure shown in FIG. 12.

The second station 109 receives the information transmitted by the first station 100 in order to decode the symbols to their corresponding X2/X1 bit pairs. The second station 109 includes, inter alia, a receiver 110 and a comb filter and trellis decoder 111. The receiver 110 performs certain signal conditioning such as demodulation. The comb filter and trellis decoder 111 filters out interference from nearby NTSC stations and decodes the symbols to recover the original bits.

A comb filter 1300, which is the comb filter portion of the comb filter and trellis decoder 111, is shown in FIG. 13. The trellis decoder portion of the comb filter and trellis decoder 111 may be a conventional Viterbi decoder.

The comb filter 1300 includes a first filter portion 1302 which has a delay element 1304 for imposing a twelve symbol delay on the data symbols processed by the comb filter 1300. The comb filter 1300 also includes a second filter portion 1306 which has an additional delay element 1308 for imposing a second twelve symbol delay on the data symbols processed by the comb filter 1300. The first and second filter portions 1302 and 1306 may be separated by a conventional equalizer. A multiplexer 1310 selects the first filter portion 1302 for all data symbols in a data segment except for the ninth through twelfth data symbols following the four segment sync symbols at the beginning of each data segment. Accordingly, all data symbols in a data segment except for the ninth through twelfth data symbols following the four segment sync symbols at the beginning of the data segment are processed with a twelve symbol delay. The multiplexer 1310 otherwise selects the second filter portion 1306 for the ninth through twelfth data symbols following the four segment sync symbols at the beginning of the data segment. Accordingly, the ninth through twelfth data symbols following the four segment sync symbols at the beginning of the data segment are processed with a twenty-four symbol delay.

Certain modifications of the present invention have been discussed above. Other modifications will occur to those practicing in the art of the present invention. For example, a single precoder and trellis encoder may be used for the precoder and trellis encoders 204 (E0–E11) if the delay elements in the precoder and trellis encoder shown in FIG. 9 are twelve bit delay elements. Because the delay element is twelve bits in length, the precoder and trellis encoder shown in FIG. 9 is the equivalent of the twelve precoder and trellis encoders 204 (E0–E11) shown in FIG. 6. For example, the precoder and trellis encoder of FIG. 9 processes bits 7 (X2) and 6 (X1) of byte zero, and twelve symbols later processes bits 5 (X2) and 4 (X1) of byte zero. Likewise, the precoder and trellis encoder shown in FIG. 9 processes bits 7 (X2) and 6 (X1) of byte one, and twelve symbols later processes bits 5 (X2) and 4 (X1) of byte one. If the twelve symbol delay precoder and trellis encoder shown in FIG. 9 is used, the byte demultiplexer 201 may be eliminated, the byte rotator 202 may comprise, for example, a memory and an addressor which writes bits into and reads bits out of the memory so that the bytes are rotated as discussed above, the byte-to-bit-pair multiplexer 203 may be eliminated, the symbol rotator 205 may comprise, for example, a memory and an addressor which writes symbols into and reads symbols out of the memory so that the symbols are rotated as discussed above, and the symbol multiplexer 206 may be eliminated.

Moreover, although the present invention has been specifically disclosed herein in terms of data symbols having corresponding ones of eight possible signal levels, it is possible that the transmitted data may be data elements having any number of possible signal levels. Also, specific encoders and decoders have been disclosed herein. However, other types of encoders and decoders may be used in the present invention. Additionally, the byte rotator 202 may be eliminated. If so, the second station 109 may be arranged to recognize the correct correspondence between data symbols and bytes. The functions of the blocks described herein may alternatively be implemented in software.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A processing apparatus for processing data elements to be inserted into a frame, wherein the frame has a plurality of data segments, wherein each data segment has a sync portion and a data portion, the processing apparatus comprising:

encoding means for encoding data as data elements;

rotating means for rotating the data elements so that data elements corresponding to one another across a sync portion of a segment are arranged to be processed together; and, inserting means for inserting the rotated data elements into the data portions of the frame.

2. The processing apparatus of claim 1 wherein a sync portion of each segment of a frame contains S data elements, wherein the rotating means rotates the data elements to be inserted into a first segment by zero, wherein the rotating means rotates the data elements to be inserted a second segment by S, wherein the rotating means rotates the data elements to be inserted a third segment by 2S, and wherein the first, second, and third segments occur in order in the frame.

3. The processing apparatus of claim 2 wherein the rotating means rotates the data elements to be inserted into a fourth segment by zero, and wherein the fourth segment occurs in order after the third segment.

4. The processing apparatus of claim 2 wherein a byte of data elements contains D data elements, wherein the data elements in B bytes of data elements are interleaved, wherein DB is a group of data elements, wherein the inserting means inserts N data elements into the data portion of the first segment so that the first segment contains N/DB groups of data elements, wherein N/DB produces a remainder of R data elements, and wherein the inserting means inserts N data elements in the second segment such that the first DB–R data elements inserted into the data portion of the second segment are from a group of data elements inserted into the first segment.

5. The processing apparatus of claim 4 wherein the rotating means rotates the bytes of data elements inserted into the first segment by zero, wherein the rotating means rotates bytes of the data elements to be inserted into the second segment by S following the first DB–R data elements inserted into the second segment, and wherein the rotating means rotates bytes of the data elements inserted into the third segment by 2S following the first DB−2R data elements to be inserted into the third segment.

6. The processing apparatus of claim 5 wherein the rotating means rotates bytes of the data elements to be inserted into a fourth segment by zero, and wherein the fourth segment occurs in order after the third segment.

7. The processing apparatus of claim 1 wherein the rotating means comprises a byte rotator and a data element rotator.

8. The processing apparatus of claim 7 wherein a sync portion of each segment of a frame contains S data elements, wherein the data element rotator is arranged to rotate the data elements to be inserted into a first segment by zero, wherein the data element rotator is arranged to rotate the data elements to be inserted into a second segment by S, wherein the data element rotator is arranged to rotate the data elements to be inserted a third segment by 2S, and wherein the first, second, and third segments occur in order in the frame.

9. The processing apparatus of claim 8 wherein the data element rotator is arranged to rotate the data elements to be inserted a fourth segment by zero, and wherein the fourth segment occurs in order after the third segment.

10. The processing apparatus of claim 8 wherein a byte of data elements contains D data elements, wherein the data elements in B bytes of data elements are interleaved, wherein DB is a group of data elements, wherein the inserting means inserts N data elements into the data portion of the first segment so that the first segment contains N/DB groups of data elements, wherein N/DB produces a remainder of R data elements, and wherein the inserting means inserts N data elements in the second segment such that the first DB−R data elements inserted into the data portion of the second segment are from a group of data elements inserted into the first segment.

11. The processing apparatus of claim 10 wherein the byte rotator is arranged to rotate bytes of the data elements to be inserted into a first segment by zero, wherein the byte rotator is arranged to rotate bytes of the data elements to be inserted into the second segment by S following the first DB−R data elements inserted into the second segment, and wherein the byte rotator is arranged to rotate bytes of the data elements to be inserted into the third segment by 2S following the first DB−2R data elements to be inserted into the third segment.

12. A receiver for receiving data symbols arranged in a frame, wherein the frame has a plurality of data segments, wherein each data segment has a sync portion and a data portion, wherein each sync portion contains four sync symbols, wherein each data portion contains 828 data symbols, wherein the data symbols are rotated so that data symbols of the same bytes separated by a sync portion of a data segment are arranged to be processed together, and wherein the receiver comprises:

receiving means for receiving the data symbols of the frame; and, processing means for processing corresponding pairs of data symbols of the same bytes together even through the data symbols of the same bytes are separated by the sync portions of each data segment.

13. The receiver of claim 12 wherein the corresponding data symbols in a first set of data symbols are separated by eleven symbols, and wherein the corresponding data symbols in a second set of data symbols are separated by twenty-three symbols.

14. The receiver of claim 13 wherein the data symbols of a first data segment are rotated by zero, wherein the data symbols of a second data segment are rotated by four, wherein the data symbols of a third data segment are rotated by eight, wherein the first, second, and third segments occur in order in the received frame, and wherein the processing means is arranged to process ninth, tenth, eleventh and twelfth data symbols in the data portion of the second data segment as second set data symbols and to process all other data symbols in the data portion of the second data segment as first set data symbols.

15. The receiver of claim 14 wherein the data symbols of a fourth data segment are rotated by zero, wherein the fourth segment occurs in order after the third data segment.

16. The receiver of claim 14 wherein a byte of data symbols contains four data symbols, wherein the data symbols in each twelve bytes of data symbols are interleaved, and wherein the last twelve data symbols in the data portion of the first data segment and the first thirty-six data symbols in the data portion of the second data segment belong to the same twelve bytes of data symbols.

17. The receiver of claim 16 wherein the first eighteen groups of twelve bytes of the data symbols beginning with the first data segment are rotated by zero, wherein the next seventeen groups of bytes of data symbols are rotated by four, wherein the next seventeen groups of bytes of data symbols are rotated by eight, and wherein the next seventeen groups of twelve bytes of the data symbols are rotated by zero.

18. The receiver of claim 17 wherein the next eighteen groups of twelve bytes of the data symbols are rotated by four.

19. The receiver of claim 13 wherein the processing means is arranged to process the corresponding data symbols in the first set with a twelve symbol delay and to process corresponding symbols in the second set with a twenty-four symbol delay.

20. A receiver for receiving data elements arranged in a frame, wherein the frame has a plurality of data segments, wherein each data segment has a sync portion and a data portion, wherein each sync portion contains S sync elements, wherein each data portion contains N data elements, wherein the data elements are rotated so that data elements corresponding to one another across each sync portion of each data segment are arranged to be processed together, wherein the receiver comprises:

receiving means for receiving the data elements of the frame; and, processing means for processing corresponding pairs of data elements depending upon a separation between corresponding data elements across the sync portions of each data segment.

21. The receiver of claim 20 wherein the data elements in a first set of data elements are separated by D−1 data elements, and wherein the data elements in a second set of data elements are separated by 2D−1 data elements.

22. The receiver of claim 21 wherein the data elements of a first data segment are rotated by X, wherein the data elements of a second data segment are rotated by Y, wherein the data elements of a third data segment are rotated by Z, wherein the first, second, and third data segments occur in order in the received frame, and wherein the processing means is arranged to process the $i^{th}$, $(i+1)^{th}$, $(i+2)^{th}$, and $(i+3)^{th}$ data elements in the data portion of the second data segment as second set data elements and to process all other data elements in the data portion of the second data segment as first set data elements.

23. The receiver of claim 22 wherein the data elements of a fourth data segment are rotated by X, and wherein the fourth data segment occurs in order after the third data segment.

24. The receiver of claim 22, wherein the data elements in each B bytes of data elements are interleaved, wherein there are D data elements in a byte of data elements, wherein DB is a group of data elements, wherein N data elements are inserted into the data portion of the first data segment so that the first data segment contains N/DB groups of data elements, wherein N/DB has a remainder of R data elements, and wherein the last R data elements in the data portion of the first data segment and the first 3R data elements in the data portion of the second data segment correspond to the same B bytes of data elements.

25. The receiver of claim 24 wherein the bytes of the data elements of the data portion of the first data segment are rotated by X, wherein the bytes of data elements of the second data segment are rotated by Y following the first 3R data elements in the data portion of the second data segment, and wherein the bytes of the data elements of the data portion of the third data segment are rotated by Z following the first 2R data elements of the data portion of the third data segment.

26. The receiver of claim 25 wherein the rotating means rotates bytes of the data elements of the data portion of a fourth data segment by X, and wherein the fourth segment occurs in order after the third data segment.

27. The receiver of claim 21 wherein the processing means is arranged to process the corresponding data elements in the first set with a twelve symbol delay and to process corresponding data elements in the second set with a twenty-four symbol delay.

* * * * *